United States Patent [19]

Mansmann et al.

[11] 4,040,860

[45] Aug. 9, 1977

[54] CHROMIUM OXIDE PIGMENT FROM SODIUM CHROMATE DIHYDRATE PLUS AMMONIUM SALT

[75] Inventors: Manfred Mansmann; Wolfgang Rambold, both of Krefeld, Germany

[73] Assignee: Bayer Aktiengesellschaft, Leverkusen, Germany

[21] Appl. No.: 656,040

[22] Filed: Feb. 6, 1976

[30] Foreign Application Priority Data

July 9, 1975 Germany .............................. 2530565

[51] Int. Cl.$^2$ ................................................ C09C 1/34
[52] U.S. Cl. .................................... 106/302; 423/596; 423/607
[58] Field of Search ................ 106/302; 423/596, 607

[56] References Cited

U.S. PATENT DOCUMENTS

| | | | |
|---|---|---|---|
| 1,429,912 | 9/1922 | D'Adrian | 423/607 |
| 2,156,451 | 5/1939 | Grasshoff | 106/302 |
| 3,278,261 | 10/1966 | Kearley | 423/607 |

FOREIGN PATENT DOCUMENTS 728,233  11/1942  Germany .............................. 106/302

*Primary Examiner*—J. Poer
*Assistant Examiner*—J. V. Howard
*Attorney, Agent, or Firm*—Burgess, Dinklage & Sprung

[57] ABSTRACT

In the production of chromium oxide green pigment by heating a substantially stoichiometrically equivalent mixture of sodium dichromate dihydrate and an ammonium salt selected from the group consisting of the sulfate and chloride, the improvement which comprises dry mixing sodium dichromate dihydrate having a particle size less than 2 mm with the ammonium salt having a particle size less than about 0.5 mm, heating the resulting mixture over a period of about 15 minutes to a pigment-forming temperature of about 800° to 1100° C, calcining the mixture at a temperature in that range, and separating the formed pigment from the salts. To the mixture prior to heating there may be added sodium hydroxide solution, boron compounds such as borax and/or organic modifiers such as sawdust which improve the color and tinting strength of the resulting pigment. The pigments are brighter, and of higher tinting strength than heretofore produced.

12 Claims, No Drawings

CHROMIUM OXIDE PIGMENT FROM SODIUM CHROMATE DIHYDRATE PLUS AMMONIUM SALT

The present invention relates to the production of improved chromium oxide green pigments.

Chromium oxide green is a valid pigment by virtue of its chemical and thermal stability. On account of its somewhat dull, green color, various attempts have been made to obtain a brighter green. Unfortunately, none of these attempts has produced the required result. In addition to color, tinting strength is an important criterion in the practical application of pigments. In practice, pigments with as high a tinting strength as possible are required for economic reasons.

Chromium oxide green is generally produced by reducing an alkali metal chromate, preferably sodium dichromate, calcining the reduction product and washing, drying and grinding the resulting calcinate. Sulfur for example is a suitable reducing agent. In other known processes, chromium oxide green is obtained by thermally decomposing special Cr(VI)-compounds, for example $CrO_3$ or $(NH_4)_2Cr_2O_7$. All these processes are characterized by the dull color of the resulting chromium oxide. In addition, the $Cr_2O_3$ formed undesirably accumulates in the form of an extremely finely divided, voluminous powder during the thermal decomposition of the ammonium dichromate. Owing to its small particle size, this product is not suitable for use as a pigment because it has only a limited tinting strength. Various attempts have already been made to densify the voluminous decomposition product of ammonium dichromate. According to Russian Patent Specification No. 107,488 for example, sodium dichromate is added in order to obtain a heavier product and to prevent dust problems from arising. According to U.S. Pat. No. 3,278,261, densification is obtained by adding from 0.1 to 5% by weight of an alkali metal halide during the thermal decomposition of the ammonium dichromate. Ammonium dichromate itself is a compound which can only be obtained by an elaborate process from the sodium chromate or sodium dichromate accumulating during the digestion of chrome ore as a starting material. To this end, a hot sodium dichromate solution is reacted with a stoichiometric quantity of ammonium chloride or ammonium sulfate, the NaCl or $Na_2SO_4$ formed is filtered off under heat and the ammonium dichromate is subsequently crystallized out by cooling. Handling has to be carried out with extreme caution on account of the danger of violent decomposition of the ammonium dichromate.

Accordingly, attempts have also been made to bypass the production of ammonium dichromate and, instead, to subject a mixture of sodium dichromate and ammonium chloride or ammonium sulfate to heating, which results in the formation of, in addition to $Cr_2O_3$, the corresponding sodium salt which can be removed by washing.

According to U.S. Pat. No. 1,429,912, ammonium sulfate is mixed with twice the quantity of $Na_2Cr_2O_7$, optionally together with a small quantity of water, and the resulting mixture is reacted at 400° C. In the process described in German Patent Specification No. 728,233, sodium dichromate and ammonium sulfate are mixed in a ratio of 70:30 and the resulting mixture is heated for several hours to a temperature in the range of from 700° to 800° C. It is also not possible by these processes to obtain pigments which are brighter green in color.

The object of the present invention is to provide chromium oxide pigments which are particularly bright green in color and, at the same time, show high tinting strength.

The present invention relates to a process for the production of chromium oxide green pigments by heating a stoichiometrically equivalent mixture of sodium dichromate dihydrate and ammonium salts, in which sodium dichromate dihydrate and ammonium salts, in which sodium dichromate dihydrate with a particle size less than about 2 mm is thoroughly dry-mixed with ammonium sulfate or ammonium chloride with a particle size less than about 0.5 mm, optionally in the presence of up to about 10% by weight of the mixture of sodium dichromate and the ammonium salt, of an inorganic or organic, modifier, the resulting mixture is heated over a period of about 15 minutes to pigment-forming temperatures in the range of about 800° to 1100° C and is calcined at temperatures in that range, after which the pigment formed is separated off from the salts.

In the process according to the invention, it is important to ensure that dry mixing of the components, sodium dichromate dihydrate and ammonium salts, is not so intensive that the sodium dichromate dihydrate loses its water of crystallization, because in that case pronounced tackiness and agglomeration would undesirably occur. Suitable mixing units are, for example, the known drum mixers, mixing screws such as, for example, paddle screws, ploughshare mixers, high-speed countercurrent mixers, and tumble mixers. The particle sizes of the starting substances used have a critical effect upon the resulting coloristic properties of the chromium oxide pigments. Accordingly, commercial-grade ammonium sulfate or ammonium chloride has to be ground to particle sizes of less than about 0.5 mm, preferably less than about 0.25 mm. Although the particle size of the sodium dichromate dihydrate is not as critical, it should nevertheless be smaller than about 2 mm.

Particularly saturated pigments are obtained by adding organic modifiers which should preferably have a decomposition point of above about 150° to 200° C. These organic modifiers are used in quantities of about 0,1 to 10% by weight and perferably in quantities of about 1 to 4% by weight based on the mixture of sodium dichromate dihydrate and the ammonium salts. Organic modifiers, from which the organic phase distills off without decomposition, are not suitable. Examples of suitable organic modifiers are starch, urea, medium viscosity mineral oil, polyethylene powder, polyethylene oxide, sawdust, wood powder, colophony, rice straw powder, active carbon, lignin preparations, molasses (beet waste), cellulose derivatives and unsaturated polyester resins. In the interests of economy, inexpensive waste or natural products, such as wood powder, starch or lignin, are preferably used.

Boron compounds such as, for example, boric acid or borates, for example alkali metal borates, have proved to be particularly effective inorganic modifiers. By adding these modifiers, the color of the chromium oxide pigment obtained can be changed from a yellow green to a bluish green. These inorganic modifiers are used in quantities of about 1 to 10% by weight and preferably in quantities of about 2 to 5% by weight, based on the mixture of sodium dichromate dihydrate and ammonium salt.

In one preferred embodiment of the process according to the invention, preparation of the intimate mixture of the sodium dichromate dihydrate and the ammonium salt is followed by the adjustment in the mixture of a water content of about 1 to 10% by weight, based on the mixture. In one particularly preferred embodiment, this water content is adjusted by the addition of dilute sodium hydroxide solution, preferably in the form of a 5 to 15% solution. Following the adjustment of certain water contents in the dry mixture, the mixture may be granulated before it is calcined into pigments. Granulation results in a further improvement in the saturation and lightness values and in an increase in the tinting strength of the chromium oxide pigments obtained.

In the context of the invention, the expression "stoichimetrically equivalent quantity" means that about 1 mole of ammonium sulfate or about 2 moles of ammonium chloride are added per mole of sodium dichromate dihydrate in order after decomposition to form 1 mole of chromium oxide and 1 mole of sodium sulfate or 2 moles of sodium chloride.

The chemical reactions on which decomposition is based may be formulated in accordance with the following equations:

$$Na_2Cr_2O_7 \cdot 2H_2O + (NH_4)_2SO_4 \rightarrow N_2 + 6H_2O + Cr_2O_3 + Na_2SO_4 \quad 1.$$

$$Na_2Cr_2O_7 \cdot 2H_2O + 2NH_4Cl \rightarrow N_2 + 6H_2O + Cr_2O_3 + 2NaCl \quad 2.$$

In the reactions corresponding to these equations, it is possible to accept small, for example 10%, deviations in either direction. A deficit of the ammonium salt is reflected in an reduction in the yield of $Cr_2O_3$ during pigment formation. A deficit amount of ammonium salt makes itself noticeable through the reduction of the $Cr_2O_3$-yield during the pigment formation. When using $(NH_4)SO_4$ as reducing agent in a special embodiment of the invention a particularly low-sulfur containing $Cr_2O_3$ can be obtained, if the deficit of $(NH_4)SO_4$ is from about 5 to 15%, preferably from about 7 to 11%.

Although an excess of the ammonium salt increases the conversion, it reduces the saturation and lightness values of the resulting chromium oxide pigments to a slight extent and results in the condensation of ammonium salts in following parts of the apparatus used.

According to the invention, calcination has to be carried out under specific conditions in order to obtain pigments of high tinting strength. It has been found that gradual heating of the mixture to the pigment forming temperature gives much poorer pigments than rapid heating. Gradual heating is obvious from the technical point of view because, for example in cases where a tubular rotary kiln is used, the starting mixture can be introduced at its cold end and the material passed through the kiln in countercurrent to the firing gases. This guarantees particularly favorable heating from the point of view of energy consumption.

If, instead, the mixture is directly introduced into the hot kiln, so that it is quickly heated to the pigment-forming temperature, for example over a period of time ranging from a few seconds up to about 15 minutes, the high-quality pigments according to the invention are obtained.

Heating of the mixture in accordance with the invention may be carried out by directly introducing the mixture into the hot zone of a rotary tube or onto the hot plate of a disc-type kiln or rotary annular kiln (German Published Specification DOS 2,320,806) whose plate is kept at the requisite temperatures. For smaller quantities, it is possible to use muffle kilns with an adequate heat capacity into which the starting mixture is introduced at the pigment-forming temperature. In the context of the invention, the pigment-forming temperature is within a temperature range of from about 800° C to about 1100° C, a longer residence time amounting to a few hours being necessary at the lower end of this range, while a shorter residence time amounting to a few minutes is required at the upper end of this temperature range. The pigment forming temperature is preferably between about 900° and 1000° C for residence time of from about 10 minutes to 1 hour.

After calcination, the pigment is worked up in the usual way. The process according to the invention has another advantage in that the calcination products are extremely easy to break up and decompose very quickly in water, the soluble sodium salts being quickly dissolved. After filtration, the products are dried in known manner and conventionally ground. However, grinding may also be carried out in suspensions, for example before filtration or before drying.

The invention is illustrated by the following Examples. As is normally the case in the assessment of pigments, a reference sample is used as a standard for assessing the properties of the products according to the invention. Accordingly, the results are based on that standard. A chromium oxide green produced in accordance with the prior art was used as the standard. It was produced by reducing alkali metal dichromates with sulfur and calcining the reduction product, followed by washing, drying and grinding.

Tinting strength was determined on a rutile blend (ratio 1:5) in a lacquer in accordance with DIN 53 234. These values are highly consistent with the determination of the standard depth of color 1:25 according to DIN 53 235. The standard used has a tinting strength of 100. The tinting strengths of the products obtained in accordance with the invention are standardized to that level.

The color intervals of the products in relation to the standard were determined in accordance with DIN 6174. The following color intervals in the color range according to the invention were obtained in accordance with Adams-Nickerson:

$\Delta E_{AN}$: total color interval in AN-units $\Delta \phi$ >0 bluer than standard <0 yellower than standard $\Delta A_S$: saturation difference (>0 = more saturated than standard)

$\Delta A_L$: lightness difference (>0 = lighter than standard)

0.5 $\Delta$ —Units correspond to about one eye threshold.

The measurements were carried out with a Elrepho three-filter photometer of the type manufactured by the Zeiss Company (without a gloss diaphragm) and with a type DMC 25 spectral photometer manufactured by the Zeiss Company (with a gloss diaphragm).

EXAMPLES 1 mole of dichromate was used in each of the following tests. The percentage additions are based on the quantity of the mixture of $Na_2Cr_2O_7 \cdot 2H_2O$ and ammonium salt. The mixtures were spread out over flat quartz glass dishes in a thickness of 1 to 2 cm and placed in a muffle furnace preheated to the calcination temperature (for example 950° C).

In the material, the temperature is reached after about 15 minutes and is maintained for the periods indicated in the Examples, followed by removal of the dish from the hot furnace. After cooling, the product is washed with a total of 5 liters of water and dried at 120° C. The conversion is determined in the first filtrate by titrating the quantity of Cr(VI) still present. The results of the tests in regard to the coloristic properties are set out in Table 1.

COMPARISON EXAMPLE A (GERMAN PAT. NO. 728,233)

70 parts by weight of $Na_2Cr_2O_7 . 2 H_2O$ with a grain size of less than 1.5 mm are dry mixed with 30 parts by weight of $(NH_4)_2SO_4$ with a grain size of less than 1.0 mm. Calcination conditions: 6 hours at 750° C.

COMPARISON EXAMPLE B (GERMAN PAT. NO. 728,233)

As A, except that the $(NH_4)_2SO_4$ used had a grain size of less than 0.25 mm.

COMPARISON EXAMPLE C (U.S. Pat. No. 1,429,912)

100 parts by weights of $Na_2Cr_2O_7$ (spray-dried, particle size less than 0.05 mm ) are dry-mixed with 50 parts of $(NH_4)_2SO_4$, followed by calcination for 70 minutes at 400° C.

EXAMPLE 1

$Na_2Cr_2O_7 . 2H_2O$ (grain size < 1.5 mm) is dry mixed with finely ground $(NH_4)_2SO_4$ (grain size < 0.25 mm). Calcination conditions: 1 hour at 950° C.

EXAMPLE 2

$Na_2Cr_2O_7 . 2 H_2O$ (grain size < 1.0 mm) is mixed in a drum with finely ground $(NH_4)_2SO_4$ (grain size $\leq$ 0.25 mm) in the presence of 2.5% of conifer wood powder. Calcination conditions: 1 hour at 950° C. (Similar results are obtained with lignin preparations, methyl cellulose, molasses (beet waste), powdered unsaturated polyester resins, starch, urea, medium-viscosity mineral oil, polyethylene powder, polyethylene oxide, sawdust, wood powder, colophony, rice straw powder, active carbon and others).

EXAMPLE 3

As Example 2, except that the $(NH_4)_2SO_4$ used has a grain size of less than 1 mm.

COMPARISON EXAMPLE D

As Example 2, except that the $(NH_4)_2SO_4$ used has a grain size of less than 0.25 mm and the $Na_2Cr_2O_7 . 2H_2O$ has a grain size of from 1.5 to 5 mm.

EXAMPLE 4

As Example 2, except that after dry mixing the product was granulated with 2.5% by weight of water.

EXAMPLE 5

As Example 2, except that after mixing product was granulated with 4% of a 66% $Na_2Cr_2O_7 . 2 H_2O$-solution.

EXAMPLE 6

As Example 2, except that after mixing the product is granulated with 4.5% of a 40% $(NH_4)_2SO_4$-solution.

EXAMPLE 7

As Example 4, calcination conditions: 1 hour at 1000° C.

COMPARISON EXAMPLE E

As Example 4, calcination conditions: 1 hour at 1140° C.

EXAMPLE 8

$Na_2CR_2O_7 . 2 H_2O$ with a grain size of less than 1.5 mm is mixed with $(NH_4)_2SO_4$ with a grain size of less than 0.25 mm and the resulting mixture is granulated with 2% of a 10% NaOH-solution. Calcination conditions: 1 hour at 950° C.

EXAMPLE 9

$Na_2Cr_2O_7 . 2H_2O$ with a grain size of less than 1.5 mm is mixed with $(NH_4)_2SO_4$ with a grain size of less than 0.25 mm and with 5% of borax. Calcination conditions: 1 hour at

EXAMPLE 10

$Na_2Cr_2SO_7 . 2H_2O$ with a grain of size of less than 1.5 mm is mixed in a stoichiometric ratio with $NC_4CL$ (< 0.25). Calcination conditions: 1 hour at 950° C.

EXAMPLE 11

As Example 10, except that 2.5% of conifer wood powder are added and the mixture is granulated with 2.5% of water. Comparison Example F As example 1, except that heating from 20° to 950° C was carried out over a period of 80 minutes, followed by heating for another hour at 950° C.

Comparison Example G As Example 10, except that heating from 20 C to 950° is carried out over a period of 80 minutes, followed by heating for another hour at 950° C.

| Ex. No. | Conversion | Tinting Strength | $\Delta E_{AN}$ | Color intervals in the pure color | | |
|---|---|---|---|---|---|---|
| | | | | $\Delta\gamma$ | $\Delta A_S$ | $\Delta A_L$ |
| A | 96.5 | 102 | 5.9 | +0.9 | −5.7 | −1.7 |
| B | 96.6 | 103 | 2.9 | 2.5 | −2.2 | 1.5 |
| C | difficult | to filter, | blotchy | black | | |
| 1 | 97.3 | 106 | 4.2 | 1.9 | 1.9 | 3.6 |
| 2 | 97.6 | 108 | 3.1 | −0.1 | 2.3 | 2.0 |
| 3 | 97.3 | 95 | 0.7 | 0.2 | 0.5 | 0.5 |
| D | 95.7 | 87 | 2.8 | 0.2 | 2.0 | 2.0 |
| 4 | 98.9 | 118 | 4.1 | −0.5 | 3.2 | 2.6 |
| 5 | 98.4 | 110 | 4.4 | −1.0 | 3.2 | 3.0 |
| 6 | 99.4 | 112 | 3.9 | −0.3 | 3.0 | 2.4 |
| 7 | 98.2 | 105 | 3.0 | −0.9 | 2.7 | 1.4 |
| E | 96.4 | 85 | 2.0 | −0.9 | −1.1 | −1.6 |
| 8 | 98.5 | 110 | 3.8 | −0.1 | 2.4 | 3.0 |
| 9 | 97.9 | 105 | 5.2 | 2.3 | 2.7 | 4.2 |
| 10 | 94.7 | 103 | 3.3 | 2.0 | 1.7 | 2.7 |
| 11 | 95.9 | 108 | 5.6 | −0.6 | 3.5 | 4.4 |
| F | 98.7 | 80 | 3.5 | 0.8 | 1.4 | 3.1 |
| G | 94.0 | 64 | 3.0 | −0.9 | 1.6 | 2.6 |

It will be appreciated that the instant specification and examples are set forth by way of illustration and not limitation, and that various modifications and changes may be made without departing from the spirit and scope of the present invention.

What is claimd is:

1. In the production of chromium oxide green pigment by heating a substantially stoichiometrically equivalent mixture of sodium dichromate dihydrate and an ammonium salt selected from the group consisting of the sulfate and chloride, the improvement which comprises thoroughly dry mixing sodium dichromate dihydrate having a particle size less than about 2 mm with the ammonium salt having a particle size less than about 0.5 mm, adding water to the mixture in about 1 to 10% by weight of the sodium dichromate dihydrate plus ammonium salt, heating the resulting mixture over a period of about 15 minutes to a pigment-forming temperature of about 800° to 1100° C. calcining the mixture at a temperature in that range, an separating the formed pigment from the salts.

2. A process as claimed in claim 1, wherein to the mixture piror to heating there is added about 0,1 to 10% of a modifier based on the weight of sodium dichromate dihydrate plus ammonium salt.

3. A process as claimed in claim 2, wherein the modifier is inorganic and is added in about 2 to 5% by weight.

4. A process as claimed in claim 3, wherein the modifier is a boron compound.

5. A process as claimed in claim 2, wherein the modifier is added in about 1 to 4% by weight and is selected from the group consisting of a lignin derivative, cellulose derivative, molasses, starch, urea, medium-viscosity mineral oil, polyethylene powder, polyethylene oxide, sawdust, wood powder, colophony, rice straw powder, unstaturated polyester resins and active carbon.

6. A process as claimed in claim 1, wherein the water is added in the form of a sodium hydroxide solution of about 5 to 15% concentration by weight.

7. A process as claimed in claim 1, wherein the mixture is directly introduced into the hot zone of a rotary tubular kiln, disc-type kiln or rotary annular kiln, which hot zone is at a temperature of about 800° to 1100° C.

8. A process as claimed in claim 1, wherein the water added to the mixture before it is heated is in the form of a 5 to 15% sodium hydroxide solution and there is also added at least one modifier selected from the group consisting of (A) about 1 to 4% by weight of wood powder, starch or lignin, and (B) about 2 5% weight of borax, and the mixture is directly introduced into the hot zone of a rotary tubular kiln, a disc-type kiln or a rotary annular kiln, which hot zone is at a temperature of about 800° to 1100° C.

9. A process as claimed in claim 1, wherein there is also added to mixture before heating at least one modifier selected from the group consisting of (A) about 1 to 4% of wood powder, starch or lignin, and (B) about 2 to 5% of borax, and wherein the mixture is directly introduced into the hot zone of a rotary tubular kiln, a disc-type kiln or a rotary annular kiln, which hot zone is at a temperature of about 800° to 1100° C.

10. Chromium oxide green produced by the process of claim 1.

11. Chromium oxide green produced by the process of claim 8.

12. Chromium oxide green produced by the process of claim 9.

* * * * *

UNITED STATES PATENT AND TRADEMARK OFFICE
CERTIFICATE OF CORRECTION

PATENT NO. : 4,040,860
DATED : August 9, 1977
INVENTOR(S) : Manfred Mansmann et al It is certified that error appears in the above-identified patent and that said Letters Patent are hereby corrected as shown below:

| | | |
|---|---|---|
| Col. 2, | lines 10 & 11 | "in which...ammonium salts" repeated. |
| Col. 4, | line 47 | "$\emptyset$" should be --$\gamma$--. |
| Col. 5, | line 20 | "$(NH_4)2$" should be --$(NH_4)_2$-- |
| Col. 5, | line 37 | "$\underline{\leq}$" should be --$\leq$-- |
| Col. 6, | line 21 | after "at" insert --950°C-- |
| Col. 6, | line 25 | "$NC_4CL$" should be --$NH_4CL$-- |
| Col. 7, | line 21 | "col" should be --cel-- |
| Col. 8, | line 10 | "2 5%" should be --2 to 5%-- |

Signed and Sealed this

Twenty-fifth Day of April 1978

[SEAL]

Attest:

RUTH C. MASON
Attesting Officer

LUTRELLE F. PARKER
Acting Commissioner of Patents and Trademarks